(12) United States Patent
Huang et al.

(10) Patent No.: US 10,896,188 B2
(45) Date of Patent: Jan. 19, 2021

(54) METHOD AND APPARATUS FOR DETERMINING SEARCH RESULTS, DEVICE AND COMPUTER STORAGE MEDIUM

(71) Applicant: Beijing Baidu Netcom Science and Technology Co., Ltd, Beijing (CN)

(72) Inventors: Jizhou Huang, Beijing (CN); Wei Zhang, Beijing (CN); Yaming Sun, Beijing (CN); Haifeng Wang, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 95 days.

(21) Appl. No.: 16/278,651

(22) Filed: Feb. 18, 2019

(65) Prior Publication Data
US 2019/0377738 A1 Dec. 12, 2019

(30) Foreign Application Priority Data

Jun. 8, 2018 (CN) .......................... 2018 1 0587495

(51) Int. Cl.
*G06F 16/2457* (2019.01)
*G06F 16/248* (2019.01)
(Continued)

(52) U.S. Cl.
CPC ...... *G06F 16/24578* (2019.01); *G06F 16/248* (2019.01); *G06N 3/04* (2013.01); *G06N 3/0445* (2013.01); *G06N 3/08* (2013.01)

(58) Field of Classification Search
CPC ... G06F 16/24578; G06F 16/248; G06N 3/04; G06N 3/0445; G06N 3/08
(Continued)

(56) References Cited

U.S. PATENT DOCUMENTS 7,818,315 B2 * 10/2010 Cucerzan ............ G06F 16/951
707/723
8,478,699 B1 * 7/2013 Alfonseca ............ G06F 16/951
706/12
(Continued)

FOREIGN PATENT DOCUMENTS

CN 102810117 A 12/2012
CN 106776869 A 5/2017
(Continued)

OTHER PUBLICATIONS

Li, Lin, et al., "QUBIC: An adaptive approach to query-based recommendation", Journal of Intelligent Information Systems, vol. 40, No. 3, Jun. 2013, pp. 555-587.*
(Continued)

*Primary Examiner* — Robert Stevens
(74) *Attorney, Agent, or Firm* — Ladas & Parry, LLP (57) ABSTRACT

The present disclosure provides a method and apparatus for determining search results, a device and a computer storage medium, wherein the method comprises: obtaining a current query, a historical query sequence of the current query and candidate search results of the current query; inputting the current query, the historical query sequence of the current query and candidate search results of the current query into a search result-sorting model, scoring the candidate search results according to the search result-sorting model, and determining search results corresponding to the current query; wherein the scores rendered by the search result-sorting model for the candidate search results are determined according to a similarity degree between an integrated vector representation of the current query and the historical query sequence of the current query and vector representations of the candidate search results. The present disclosure (Continued)

can provide the user with search results which more accurately reflect the user's demands.

21 Claims, 5 Drawing Sheets

(51) Int. Cl.
 *G06N 3/04* (2006.01)
 *G06N 3/08* (2006.01)
(58) Field of Classification Search
 USPC .......................................................... 707/727
 See application file for complete search history.

(56) References Cited

U.S. PATENT DOCUMENTS

| | | | | |
|---|---|---|---|---|
| 8,577,913 | B1* | 11/2013 | Hansson | G06F 3/048 |
| | | | | 707/767 |
| 8,661,030 | B2* | 2/2014 | El-Saban | G06F 16/951 |
| | | | | 707/723 |
| 8,983,971 | B2* | 3/2015 | Hu | G06Q 30/02 |
| | | | | 707/748 |
| 10,089,580 | B2* | 10/2018 | Shan | G06N 3/0454 |
| 2004/0249831 | A1* | 12/2004 | Fagin | G06F 16/24553 |
| 2016/0154852 | A1* | 6/2016 | Chen | G06F 16/24575 |
| | | | | 707/769 |
| 2016/0371379 | A1* | 12/2016 | Fang | G06F 16/951 |
| 2017/0262449 | A1* | 9/2017 | Venkataraman | G06F 16/3325 |
| 2018/0004752 | A1* | 1/2018 | Deng | G06F 16/24578 |
| 2018/0011857 | A1* | 1/2018 | Xie | G06F 16/9535 |
| 2019/0266257 | A1* | 8/2019 | Natchu | G06F 16/95 |

FOREIGN PATENT DOCUMENTS

| | | |
|---|---|---|
| CN | 107423298 A | 12/2017 |
| CN | 107832432 A | 3/2018 |
| CN | 108062561 A | 5/2018 |

OTHER PUBLICATIONS

Kang, Guosheng, et al., "Diversifying Web Service Recommendation Results via Exploring Service Usage History", IEEE Transactions on Services Computing, vol. 9, No. 4, Jul./Aug. 2016, pp. 566-579.*

Haveliwala, Taher H., "Topic-Sensitive PageRank: A Context-Sensitive Ranking Algorithm for Web Search", IEEE Transactions on Knowledge and Data Engineering, vol. 15, No. 4, Jul./Aug. 2003, pp. 784-796.*

Fagin, Ronald, et al., "Efficient Similarity and Classification via Rank Aggregation", SIGMOD 2003, San Diego, CA, Jun. 9-12, 2003 , pp. 301-312.*

First Office Action and search report from CN app. No. 201810587495.0, dated Jun. 19, 2019, with English translation from Global Dossier, 18 pages.

* cited by examiner

МЕТHOD AND APPARATUS FOR DETERMINING SEARCH RESULTS, DEVICE AND COMPUTER STORAGE MEDIUM

The present application claims the priority to Chinese Patent Application No. 201810587495.0, filed on Jun. 8, 2018, with the title of "Method and apparatus for determining search results, device and computer storage medium". The disclosure of the above application is incorporated herein by reference in its entirety.

FIELD OF THE DISCLOSURE

The present disclosure relates to the technical field of computer application, and particularly to a method and apparatus for determining search results, a device and a computer storage medium.

BACKGROUND OF THE DISCLOSURE

Figure 1:
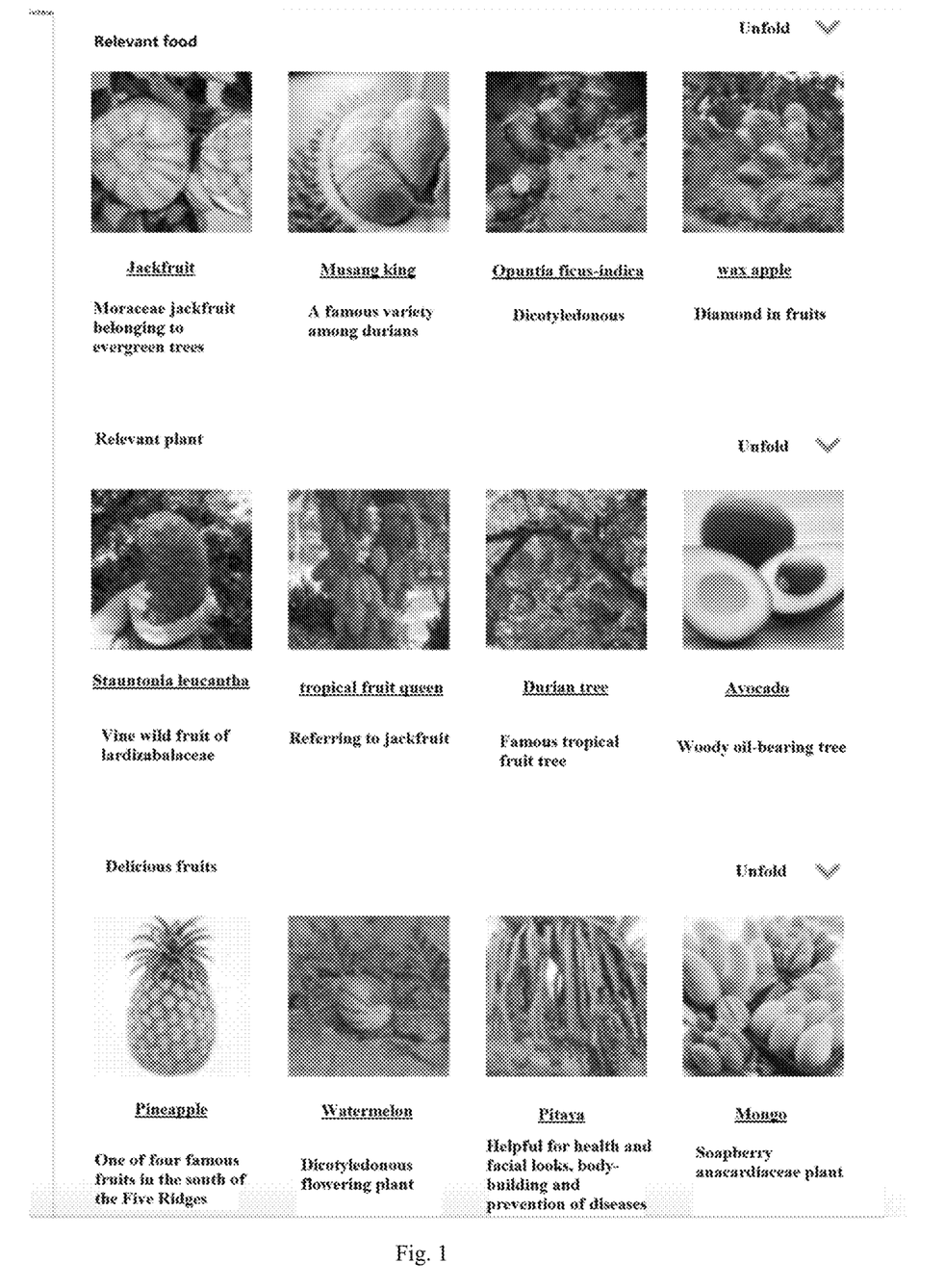
FIG. 1 is a diagram of an instance of relevant entity recommendations.

In recent years, to provide a user with richer search results and better search experience, mainstream search engines provide relevant entity recommendations for the user's search. For example, when the user uses a search engine to search for a query "durian", the search engine provides relevant entity recommendations shown in FIG. 1 in the search results. The recommendations are for example entities such as "jackfruit", "musang king", "*Opuntia ficus-indica*", "wax apple", "*Stauntonia leucantha*", "tropical fruit queen", "pineapple", "watermelon" and "pitaya". Take Baidu as an example. Entity-related recommendation results are displayed in a right area of a search result page, and displayed in a manner of multiple relevant classes. Certainly, it is also possible to display the entity-related recommendation results in other areas of the search result page, and only display related entities under one related class.

Conventional relevant entity recommendations only take into account the user's current query. This situation cannot solve the problem about inaccuracy of entities related to an ambiguous query. For example, if the user's current query is "Apple", it is impossible to know whether "Apple" refers to a fruit, a movie or a corporation name, so it is certain that the user's demands cannot be reflected accurately when related entities are recommended.

SUMMARY OF THE DISCLOSURE

In view of the above, the present disclosure provides a method and apparatus for determining search results, a device and a computer storage medium, to provide the user with search results which better meet the user's demands.

Specific technical solutions are as follows:

The present disclosure provides a method of determining search results, the method comprising:

obtaining a current query, a historical query sequence of the current query and candidate search results of the current query;

inputting the current query, the historical query sequence of the current query and candidate search results of the current query into a search result-sorting model, scoring the candidate search results according to the search result-sorting model, and determining search results corresponding to the current query; wherein the scores rendered by the search result-sorting model for the candidate search results are determined according to a similarity degree between an integrated vector representation of the current query and the historical query sequence of the current query and vector representations of the candidate search results.

According to a specific implementation mode of the present disclosure, the historical query sequence of the current query comprises N queries before the current query in the same session, N being a positive integer.

According to a specific implementation mode of the present disclosure, an integrated vector representation of the current query and the historical query sequence of the current query is determined in the following manner:

integrating the vector representation of the current query and the vector representation of the historical query sequence of the current query.

According to a specific implementation mode of the present disclosure, the vector representation of the historical query sequence of the current query is determined in the following manner:

using an attention mechanism to perform weighted processing for vector representations of respective queries in the historical query sequence of the current query, to obtain a vector representation of the historical query sequence of the current query.

According to a specific implementation mode of the present disclosure, the vector representation is determined in the following manner:

allowing input content to go through neural network processing and then obtaining a vector representation of the input content; wherein the input content includes the current query or queries in the historical query sequence of the current query.

According to a specific implementation mode of the present disclosure, the neural network comprises: a Recurrent Neural Network RNN or a Convolutional Neural Network.

According to a specific implementation mode of the present disclosure, the method further comprises:

displaying search results corresponding to the current query in a search result page of the current query.

According to a specific implementation mode of the present disclosure, the search results include:

relevant entities or relevant webpages.

The present disclosure further provides a method of training a search result sorting model, the method comprising:

using a search log to obtain a training sample, the training sample comprising a sample query, a historical query sequence of the sample query, candidate search results of the sample query, and click situations of the candidate search results;

regarding the sample query, the historical query sequence of the sample query and the candidate search results of the sample query as input of a sorting model, regarding scores of the candidate search results rendered by the sorting model as output, and training the sorting model to achieve a preset training target; wherein the scores rendered by the sorting model for the candidate search results are determined according to a similarity degree between an integrated vector representation of the sample query and the historical query sequence of the sample query and vector representations of the candidate search results of the sample query; the training target includes: maximizing relevancy between click situations of the candidate search results and scores of candidate search results;

using the sorting model obtained from the training to obtain a search result-sorting model.

According to a specific implementation mode of the present disclosure, the search results comprise: first-class search results and second-class search results;

the sorting model comprises a shared vector sub-model, a first sorting sub-model and a second sorting sub-model;

inputting the sample query and the historical query sequence of the sample query into the shared vector sub-model to obtain an integrated vector representation of the sample query and the historical query sequence of the sample query;

regarding the integrated vector representation and the candidate first-class search results of the sample query as input of the first sorting sub-model, the first sorting sub-model outputting scores of respective candidate first-class search results; determining the scores of the candidate first-class search results according to a similarity degree between the integrated vector representation of the sample query and the historical query sequence of the sample query and the vector representations of the candidate first-class search results of the sample query;

regarding the integrated vector representation and candidate second-class search results of the sample query as input of the second sorting sub-model, the second sorting sub-model outputting scores of respective candidate second-class search results; determining the scores of the candidate second-class search results according to a similarity degree between the integrated vector representation of the sample query and the historical query sequence of the sample query and the vector representations of the candidate second-class search results of the sample query;

training the first sorting sub-model and second sorting sub-model to achieve respective preset training targets; the training target of the first sorting sub-model includes: maximizing relevancy between click situations of the candidate first-class search results and scores of candidate first-class search results, and the training target of the second sorting sub-model includes: maximizing relevancy between click situations of the candidate second-class search results and scores of candidate second-class search results;

after completion of the training, using the shared vector sub-model and one of the first sorting sub-model and the second sorting sub-model, to obtain the search result sorting model.

According to a specific implementation mode of the present disclosure, the training the first sorting sub-model and second sorting sub-model comprises:

during training iteration, randomly selecting one from the first sorting sub-model and second sorting sub-model for training each time; or alternatingly training the first sorting sub-model and second sorting sub-model during the training iteration.

According to a specific implementation mode of the present disclosure, an integrated vector representation of the sample query and the historical query sequence of the sample query is determined in the following manner:

integrating the vector representation of the sample query and the vector representation of the historical query sequence of the sample query.

According to a specific implementation mode of the present disclosure, the vector representation of the historical query sequence of the sample query is determined in the following manner:

using an attention mechanism to perform weighted processing for vector representations of respective queries in the historical query sequence of the sample query, to obtain a vector representation of the historical query sequence of the sample query.

According to a specific implementation mode of the present disclosure, the vector representation is determined in the following manner:

allowing input content to go through neural network processing and then obtaining a vector representation of the input content; wherein the input content includes the sample query or queries in the historical query sequence of the sample query.

According to a specific implementation mode of the present disclosure, the neural network comprises: a Recurrent Neural Network RNN or a Convolutional Neural Network.

According to a specific implementation mode of the present disclosure, the first-class search results are relevant entities, and the second-class search results are relevant webpages.

According to a specific implementation mode of the present disclosure, a training object of the first sorting sub-model comprises: minimizing a preset first loss function;

wherein the first loss function is determined by using a negative log likelihood function of each $P(e^+|c, q_t)$;

where $q_t$ is the sample query, $e^+$ is a clicked candidate relevant entity of the sample query, and c is the historical query sequence of the sample query, $$P(e^+ \mid c, q_t) = \frac{\exp(\gamma f(c, q_t, e^+))}{\sum_{e \in E_t} \exp(\gamma f(c, q_t, e))},$$

e is the candidate relevant entity of the sample query, $E_t$ is a candidate relevant entity set of the sample query, $f(c, q_t, e)$ is a similarity degree score between the integrated vector representation of $q_t$ and c and the vector representation of e, and γ is a preset parameter;

a training object of the second sorting sub-model may comprise: minimizing a preset second loss function, wherein the second loss function is determined by using a negative log likelihood function of each $P(d^+|c, q_t)$;

where $q_t$ is the sample query, $d^+$ is a clicked candidate relevant webpage of the sample query, and c is the historical query sequence of the sample query, $$P(d^+ \mid c, q_t) = \frac{\exp(\lambda f(c, q_t, d^+))}{\sum_{d \in D_t} \exp(\lambda f(c, q_t, d))},$$

d is the candidate relevant webpage of the sample query, $D_t$ is a candidate relevant webpage set of the sample query, $f(c, q_t, d)$ is a similarity degree score between the integrated vector representation of $q_t$ and c and the vector representation of d, and λ is a preset parameter.

The present disclosure further provides an apparatus of determining search results, the apparatus comprising:

an obtaining unit configured to obtain a current query, a historical query sequence of the current query and candidate search results of the current query;

a determining unit configured to input the current query, the historical query sequence of the current query and candidate search results of the current query into a search result-sorting model, score the candidate search results according to the search result-sorting model, and determine search results corresponding to the current query; wherein the scores rendered by the search result-sorting model for the candidate search results are determined according to a similarity degree between an integrated vector representation of the current query and the historical query sequence of the current query and vector representations of the candidate search results.

According to a specific implementation mode of the present disclosure, the historical query sequence of the current query comprises N queries before the current query in the same session, N being a positive integer.

According to a specific implementation mode of the present disclosure, the determining unit is specifically configured to integrate the vector representation of the current query and the vector representation of the historical query sequence of the current query, and obtain an integrated vector representation of the current query and the historical query sequence of the current query.

According to a specific implementation mode of the present disclosure, the determining unit specifically uses an attention mechanism to perform weighted processing for vector representations of respective queries in the historical query sequence of the current query, to obtain a vector representation of the historical query sequence of the current query.

According to a specific implementation mode of the present disclosure, the determining unit is specifically configured to allow input content to go through neural network processing and then obtains a vector representation of the input content; wherein the input content includes the current query or queries in the historical query sequence of the current query; the neural network comprises: a Recurrent Neural Network RNN or a Convolutional Neural Network.

According to a specific implementation mode of the present disclosure, the search results include: relevant entities or relevant webpages.

The present disclosure further provides an apparatus for training a search result sorting model, the apparatus comprising:

a sample obtaining unit configured to use a search log to obtain a training sample, the training sample comprising a sample query, a historical query sequence of the sample query, candidate search results of the sample query, and click situations of the candidate search results;

a model training unit configured to regard the sample query, the historical query sequence of the sample query and the candidate search results of the sample query as input of a sorting model, regard scores of the candidate search results rendered by the sorting model as output, and train the sorting model to achieve a preset training target; wherein the scores rendered by the sorting model for the candidate search results are determined according to a similarity degree between an integrated vector representation of the sample query and the historical query sequence of the sample query and vector representations of the candidate search results of the sample query; the training target includes: maximizing relevancy between click situations of the candidate search results and scores of candidate search results;

a model obtaining unit configured to use the sorting model obtained from the training to obtain a search result-sorting model.

According to a specific implementation mode of the present disclosure, the search results comprise: first-class search results and second-class search results;

the sorting model comprises a shared vector sub-model, a first sorting sub-model and a second sorting sub-model;

the model training unit is specifically configured to input the sample query and the historical query sequence of the sample query into the shared vector sub-model to obtain an integrated vector representation of the sample query and the historical query sequence of the sample query; regard the integrated vector representation and the candidate first-class search results of the sample query as input of the first sorting sub-model, the first sorting sub-model outputting scores of respective candidate first-class search results; determine the scores of the candidate first-class search results according to a similarity degree between the integrated vector representation of the sample query and the historical query sequence of the sample query and the vector representations of the candidate first-class search results of the sample query; regard the integrated vector representation and candidate second-class search results of the sample query as input of the second sorting sub-model, the second sorting sub-model outputting scores of respective candidate second-class search results; determine the scores of the candidate second-class search results according to a similarity degree between the integrated vector representation of the sample query and the historical query sequence of the sample query and the vector representations of the candidate second-class search results of the sample query; train the first sorting sub-model and second sorting sub-model to achieve respective preset training targets; the training target of the first sorting sub-model includes: maximizing relevancy between click situations of the candidate first-class search results and scores of candidate first-class search results, and the training target of the second sorting sub-model includes: maximizing relevancy between click situations of the candidate second-class search results and scores of candidate second-class search results;

the model obtaining unit is specifically configured to, after completion of the training of the model training unit, use the shared vector sub-model and one of the first sorting sub-model and the second sorting sub-model, to obtain the search result sorting model.

According to a specific implementation mode of the present disclosure, the model training unit is specifically configured to, during training iteration, randomly select one from the first sorting sub-model and second sorting sub-model for training each time; or alternatingly train the first sorting sub-model and second sorting sub-model during the training iteration.

According to a specific implementation mode of the present disclosure, the model training unit is specifically configured to use an attention mechanism to perform weighted processing for vector representations of respective queries in the historical query sequence of the sample query, to obtain a vector representation of the historical query sequence of the sample query; integrate the vector representation of the sample query and the vector representation of the historical query sequence of the sample query to obtain an integrated vector representation of the sample query and the historical query sequence of the sample query.

According to a specific implementation mode of the present disclosure, the first-class search results are relevant entities, and the second-class search results are relevant webpages.

The present disclosure further provides a device, the device comprising:
 one or more processors;
 a storage for storing one or more programs;
 the one or more programs, when executed by said one or more processors, enable said one or more processors to implement the above-mentioned method.

The present disclosure further provides a storage medium including computer executable instructions, wherein the computer executable instructions, when executed by a computer processor, implement the abovementioned method.

As can be seen from the above technical solutions, in the present disclosure, the historical query sequence of the current query is regarded as a basis for determining search results, the determination of search results is achieved by a context-related search result sorting model, thereby improving the accuracy of search result recommendation so that it better meets the user's search demands. The present disclosure, when applied to entity recommendation, can provide more accurate relevant entities meeting the user's search demands.

DETAILED DESCRIPTION OF PREFERRED EMBODIMENTS

The present disclosure will be described in detail in conjunction with figures and specific embodiments to make objectives, technical solutions and advantages of the present disclosure more apparent.

The method according to the present disclosure is applied to a search engine of a computer system, executed by a computer or processor to use the user's historical queries to improve an effect of determining the search results. Search results involved in embodiments of the present disclosure may comprise relevant entities or relevant webpages. That is to say, the manner provided by the present disclosure may be used to perform relevant entity recommendation with respect to a current query, or may be used to perform relevant webpage recommendation with the current query.

In subsequent embodiments, an example is taken in which relevant entity recommendation is performed with respect to the current query. The principle of relevant webpage recommendation is similar. The present disclosure will be described in detail below in conjunction with embodiments.

Embodiment 1

Figure 2:
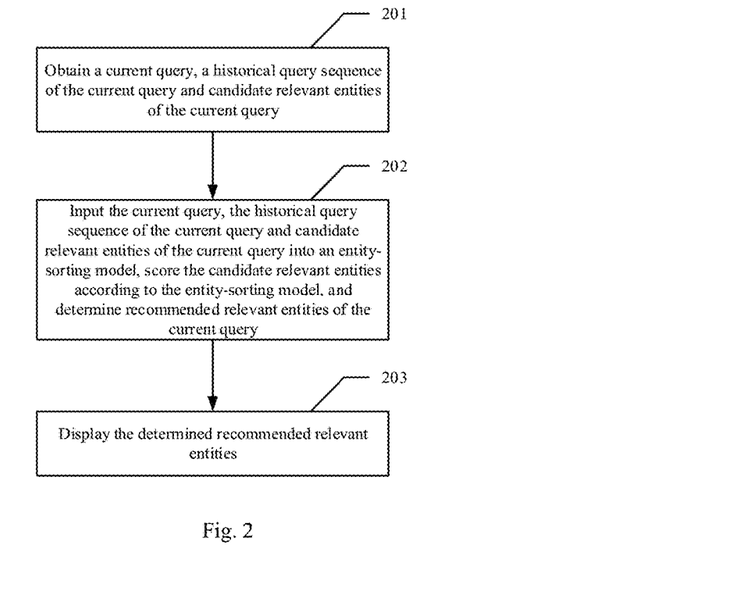
FIG. 2 is a flow chart of a relevant entity-recommending method according to an embodiment of the present disclosure.

FIG. 2 is a flow chart of a relevant entity-recommending method according to an embodiment of the present disclosure. As shown in FIG. 2, the method may comprise the following steps:

At 201, obtain a current query, a historical query sequence of the current query and candidate relevant entities of the current query.

The current query refers to a query currently input by the user. The historical query sequence of the current query may comprise N queries before the current query in the same session, N being a positive integer. N may be a value which is not set. For example, all queries before the current query in the same session are all regarded as the content of the historical query sequence. For example, if the user inputs the current query "Chicago" and he previously inputs "Titanic" and "Avatar", the historical query sequence of the current query includes "Titanic" and "Avatar". N may also be a preset value. For example, 20 queries before the current query in the same session are regarded as the content of historical query sequence.

A manner of obtaining candidate relevant entities of the current query is not limited in the embodiment of the present disclosure. For example, it is feasible to select, from a text set, entities co-occurring with the current query in a preset-length window, and regard entities satisfying preset co-occurrence times as the candidate relevant entities of the current query.

At 202, input the current query, the historical query sequence of the current query and the candidate relevant entities of the current query into an entity-sorting model, score the candidate relevant entities according to the entity-sorting model, and determine recommended relevant entities of the current query; wherein the scores rendered by the entity-sorting model for the candidate relevant entities are determined according to a similarity degree between an integrated vector representation of the current query and the historical query sequence of the current query and vector representations of the candidate relevant entities.

In the embodiment of the present discourse, the entity-sorting model is employed to score respective candidate relevant entities of the current query, thereby determining the recommended relevant entities according to the scores. For example, it is possible to regard candidate relevant entities whose scores satisfy certain requirements as the recommended relevant entities, or further sort display positions of the recommended relevant entities according to the scores. The score satisfying certain requirements may comprise: scores rank at top M, M being a preset positive integer; or scores exceed a preset threshold.

In the embodiment of the present disclosure, the entity-sorting model is obtained by pre-training with training data, and will be described in detail in the method of training the entity-sorting model in Embodiment 2.

Figure 3:
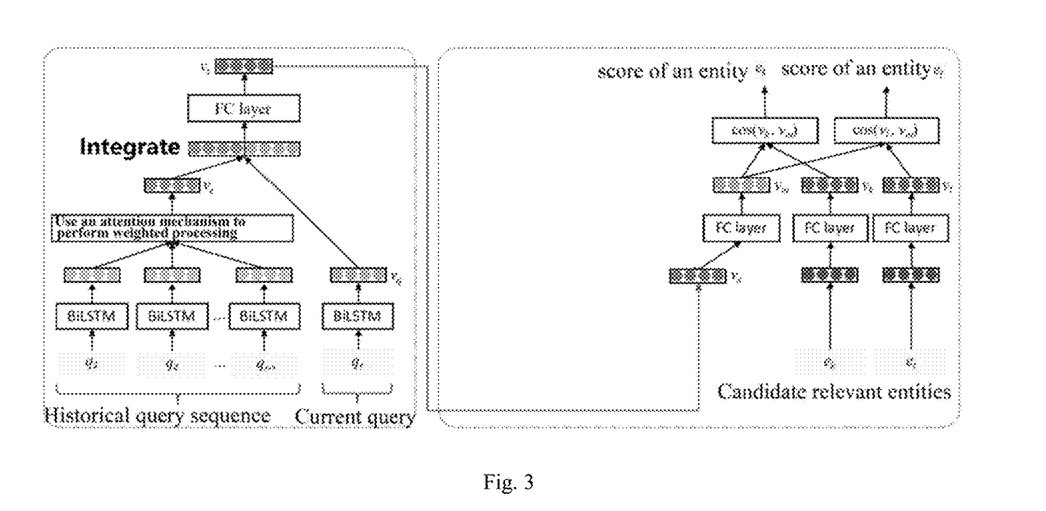
FIG. 3 is a structural schematic diagram of an entity-sorting model according to an embodiment of the present disclosure.

The entity-sorting model obtained from training can output scores of respective candidate relevant entities with respect to the input current query, historical query sequence of the current query and candidate relevant entities of the current query. The structure of the entity-sorting model may be as shown in FIG. 3.

In the figure, the input current query is represented as $q_t$, and a vector representation $v_q$ of the current query may be obtained through a neural network. The historical query sequence of the input current query is represented as $q_1$, $q_2$, ..., $q_{t-1}$ in the figure, and vector representations of the queries may be obtained through the neural network. In the embodiment of the present disclosure, the neural network may employ for example a Recurrent Neural Network (RNN), a Convolutional Neural Network (CNN) or the like. RNN is preferable. The embodiment of the present disclosure employs a Bidirectional Long Short-Term Memory (BiLSTM) network. To find a historical query most helpful for the current query, an attention mechanism may be used to perform weighted processing for vectors of respective queries to obtain a vector representation $v_c$ of the historical query sequence of the current query.

It is feasible to integrate the vector representation $v_c$ of the historical query sequence of the current query and the vector representation $v_q$ of the current query, and then obtain an integrated vector representation $v_s$ of the historical query sequence of the current query and the current query after a fully-connected layer (FC layer) mapping. The integrating may employ a manner such as concatenating or averaging. The concatenating manner is employed in the embodiment of the present disclosure.

$e_k$ and $e_l$ are taken as examples of the candidate relevant entities of the current query in the figure. However, the number of candidate relevant entities in an actual scenario is not limited to two. Usually, there are a larger number of candidate relevant entities. Vector representations of the candidate relevant entities (a manner of obtaining the vector representations is not limited in the present disclosure; for example, it is possible to map relevant entities to a vector space formed by all entities to obtain vector IDs of the relevant entities; again for example, it is possible to allow description texts of relevant entities to pass through a neural network such as RNN or CNN to obtain the vector IDs of the relevant entities) and $v_s$ respectively undergo the fully-connected layer mapping to obtain the vector representations ($v_k$ and $v_l$ in the figure) of the candidate relevant entities and the integrated vector representation $v_m$ of the current query and the historical query sequence of the current query respectively. Then, it is feasible to respectively determine a similarity degree between the vector representations of relevant entities and the integrated vector representation $v_m$, represented as $\cos(v_k, v_m)$ and $\cos(v_l, v_m)$ in the figure, and further output scores of entities $e_k$ and $e_l$ respectively according to $\cos(v_k, v_m)$ and $\cos(v_l, v_m)$, wherein the higher the similarity degree is, the higher the corresponding scores are.

At 203, display the determined recommended relevant entities.

In the embodiment of the present disclosure, it is feasible to display the recommended relevant entities in the search result page of the current query, for example, display the recommended relevant entities in a right area of the search result page of the current query. Certainly, in addition, it is also feasible to display at other positions of the search result page. The present disclosure does not limit the display positions of recommended relevant entities in the search result page.

For example, the user inputs the current query "Chicago" and the historical query sequence of the current query includes "Titanic" and "Moulin Rouge". According to the method of the embodiment of the present disclosure, due to participation of the historical query sequence, candidate relevant entities related to movies among candidate relevant entities related to the query "Chicago" have higher scores, so candidate entities related to movies are regarded as the recommended relevant entities. It is possible to, in this manner, exclude ambiguity of the current query, correctly predict the user's entity recommendation demands, and make the relevant entity recommendation more accurate.

However, in the conventional relevant entity recommendation, the same relevant entities are recommended to all users with respect to the query "Chicago", for example, entities relevant to the city "Chicago" are recommended to all users by default.

Embodiment 2

Figure 4:
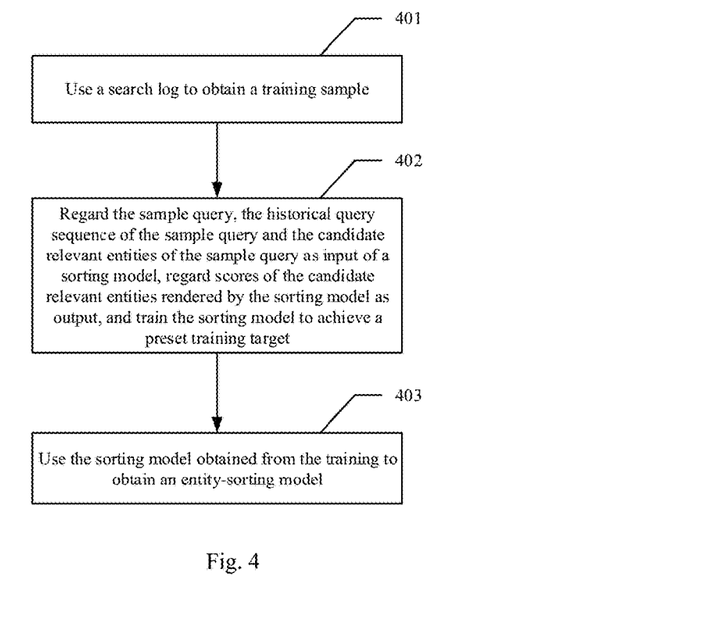
FIG. 4 is a flow chart of a method of training an entity-sorting model according to an embodiment of the present disclosure.

FIG. 4 is a flow chart of a method of training an entity-sorting model according to an embodiment of the present disclosure. As shown in FIG. 4, the method may comprise the following steps:

At 401, use a search log to obtain a training sample.

The obtained training sample comprises a sample query, a historical query sequence of the sample query, candidate relevant entities of the sample query, and click situations of the candidate relevant entities. The query input by the user in the search log serves as the sample query. The historical query sequence of the sample query may comprise N queries input by the same user before the sample query, N being a positive integer.

At 402, regard the sample query, the historical query sequence of the sample query and the candidate relevant entities of the sample query as input of an entity-sorting model, regard scores of the candidate relevant entities rendered by the sorting model as output, and train the sorting model to achieve a preset training target.

The scores rendered by the entity-sorting model for the candidate relevant entities are determined according to a similarity degree between an integrated vector representation of the sample query and the historical query sequence of the sample query and a vector representation of the candidate relevant entities of the sample query. The training target may include: maximizing relevancy between click situations of the candidate relevant entities and scores of candidate relevant entities.

In the embodiment of the present discourse, it is feasible to train the sorting model as shown in FIG. 3, regard the sample query as $q_t$ in FIG. 3, and obtain a vector representation $v_q$ of the sample query through a neural network. The historical query sequence of the input sample query is represented as $q_1, q_2, \ldots, q_{t-1}$ in the figure, and vector representations of the queries may be obtained through the neural network. In the embodiment of the present disclosure, the neural network may employ for example a Recurrent Neural Network (RNN), a Convolutional Neural Network (CNN) or the like. RNN is preferable. The embodiment of the present disclosure employs a Bidirectional Long Short-Term Memory (BiLSTM) network. To find a historical query most helpful for the sample query, an attention mechanism may be used to perform weighted processing for vectors of respective queries to obtain a vector representation $v_c$ of the historical query sequence of the sample query.

It is feasible to integrate the vector representation $v_c$ of the historical query sequence of the sample query and the vector representation $v_q$ of the sample query, and then obtain an integrated vector representation $v_s$, of the historical query sequence of the sample query and the sample query after a fully-connected layer (FC layer) mapping. The integrating may employ a manner such as concatenating or averaging. The concatenating manner is employed in the embodiment of the present disclosure.

$e_k$ and $e_l$ are taken as examples of the candidate relevant entities of the sample query in the figure. However, the number of candidate relevant entities in an actual scenario is not limited to two. Usually, there are a larger number of candidate relevant entities. Vector representations of the candidate relevant entities and $v_s$ respectively undergo the fully-connected layer mapping to obtain the vector representations ($v_k$ and $v_l$ in the figure) of the candidate relevant entities and the integrated vector representation $v_m$ of the sample query and the historical query sequence of the sample query respectively. Then, it is feasible to respectively determine a similarity degree between the vector representations of relevant entities and the integrated vector representation $v_m$, represented as $\cos(v_k, v_m)$ and $\cos(v_l, v_m)$ in the figure, and further output scores of entities $e_k$ and $e_l$ respectively according to $\cos(v_k, v_m)$ and $\cos(v_l, v_m)$, wherein the higher the similarity degree is, the higher the corresponding scores are.

In the embodiment of the present disclosure, a training target of the sorting model may take a form of minimizing a preset loss function, wherein the loss function Loss may be determined by using a negative log likelihood function of each $P(e^+|c, q_t)$, for example, $$\text{Loss} = -\log \prod_{(c, q_t, e^+) \in \tau_{q_t}} P(e^+ | c, q_t)$$

where $q_t$ is the sample query, $e^+$ is a clicked candidate relevant entity of the sample query, and c is the historical query sequence of the sample query.

$$P(e^+ | c, q_t) = \frac{\exp(\gamma f(c, q_t, e^+))}{\sum_{e \in E_t} \exp(\gamma f(c, q_t, e))}$$

e is the candidate relevant entity of the sample query, $E_t$ is a candidate relevant entity set of the sample query, $\gamma$ is a preset parameter, and $f(c, q_t, e)$ is a similarity degree score between the integrated vector representation of $q_t$ and c and the vector representation of e.

During training, Loss is used to constantly iteratively update parameters of the sorting model until iteration stop conditions are satisfied. The iteration stop conditions may include but not limited to: Loss converges, Loss is smaller than a preset threshold, or iteration times reach a preset times threshold.

At 403, use the sorting model obtained from the training to obtain an entity-sorting model.

Upon completion of the training, the sorting model as shown in FIG. 3 may be used as the entity-sorting model.

In addition to the above training manner, embodiments of the present disclosure provide a preferred training manner here, namely, using a multi-task model to train the entity-sorting model. In this manner, the sorting model may include a shared vector sub-model, a first sorting sub-model and a second sorting sub-model. At this time, in addition to the sample query, the historical query sequence of the sample query, candidate relevant entities of the sample query, and click situations of the candidate relevant entities, the training samples further include relevant webpages corresponding to the sample queries, and click situations of respective relevant webpages.

In this training manner, impact exerted by relevant webpages of the query on relevant entity recommendation is introduced, and the sorting model (namely, the second sorting sub-model) of the relevant webpages is used to assist the sorting model (namely, the first sorting sub-model) for the relevant entity recommendation. The model training of such multi-task learning uses association between different task models to improve extensibility of the model.

Figure 5:
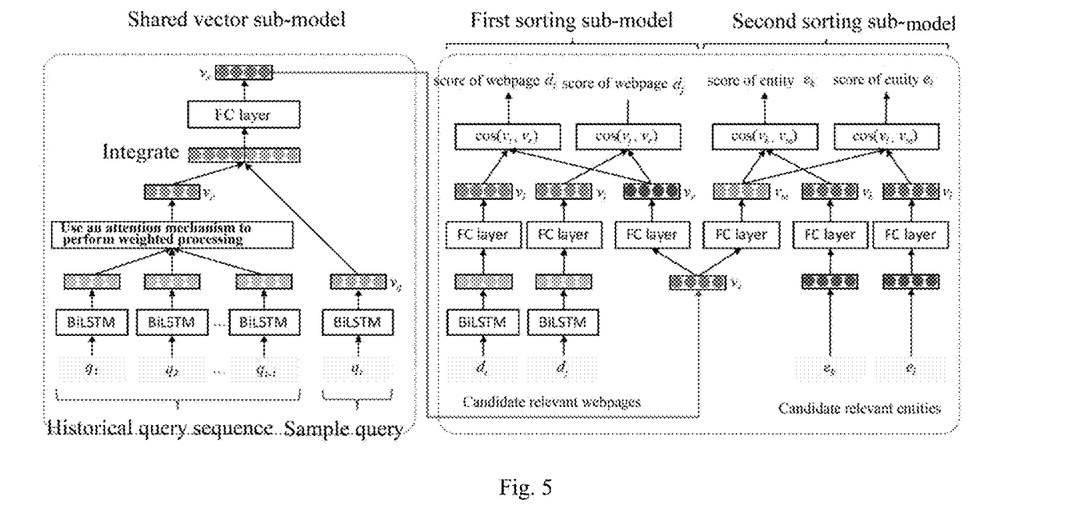
FIG. 5 is a structural schematic diagram of training a multi-task model according to an embodiment of the present disclosure.

Specifically, such sorting model may be as shown in FIG. 5, wherein the sample query and the historical query sequence of the sample query are input into the shared vector sub-model to obtain an integrated vector representation of the sample query and the historical query sequence of the sample query.

In the shared vector sub-model, the input sample query is represented as $q_t$ in the figure, and a vector representation $v_q$ of the sample query may be obtained through a neural network. The historical query sequence of the input sample query is represented as $q_1, q_2, \ldots, q_{t-1}$ in the figure, and vector representations of the queries may be obtained through the neural network. In the embodiment of the present disclosure, the neural network may employ for example a Recurrent Neural Network (RNN), a Convolutional Neural Network (CNN) or the like. RNN is preferable. The embodiment of the present disclosure employs a Bidirectional Long Short-Term Memory (BiLSTM) network. To find a historical query most helpful for the sample query, an attention mechanism may be used to perform weighted processing for vector representations of respective queries to obtain a vector representation $v_c$ of the historical query sequence of the sample query.

It is feasible to integrate the vector representation $v_c$ of the historical query sequence of the sample query and the vector representation $v_q$ of the sample query, and then obtain an integrated vector representation $v_s$ of the historical query sequence of the sample query and the sample query after a fully-connected layer (FC layer) mapping. The integrating may employ a manner such as concatenating or averaging. The concatenating manner is employed in the embodiment of the present disclosure.

The integrated vector representation and the candidate relevant entities of the sample query serve as input of the first sorting sub-model, and the first sorting sub-model outputs scores of respective candidate relevant entities; the scores of the candidate relevant entities are determined according to a similarity degree between the integrated vector representation of the sample query and the historical query sequence of the sample query and the vector representations of the candidate relevant entities of the sample query.

Specifically, $e_k$ and $e_l$ are taken as examples of the candidate relevant entities of the input sample query in the figure. However, the number of candidate relevant entities in an actual scenario is not limited to two. Usually, there are a larger number of candidate relevant entities. Vector representations of the candidate relevant entities and $v_s$ respectively undergo the fully-connected layer mapping to obtain the vector representations ($v_k$ and $v_l$ in the figure) of the candidate relevant entities and the integrated vector representation $v_m$ of the sample query and the historical query sequence of the sample query respectively. Then, it is feasible to respectively determine a similarity degree between the vector representations of relevant entities and the integrated vector representation $v_m$, represented as $\cos(v_k, v_m)$ and $\cos(v_l, v_m)$ in the figure, and further output scores of entities $e_k$ and $e_l$ respectively according to $\cos(v_k, v_m)$ and $\cos(v_l, v_m)$, wherein the higher the similarity degree is, the higher the corresponding scores are.

The integrated vector representation and relevant webpages of the sample query serve as input of the second sorting sub-model, and the second sorting sub-model outputs scores of the relevant webpages; the scores of the relevant webpages are determined according to a similarity degree between the integrated vector representation of the sample query and the historical query sequence of the sample query and the vector representations of the relevant webpages of the sample query.

Specifically, $d_i$ and $d_j$ are taken as examples of the candidate relevant webpages of the input sample query in the figure. However, the number of candidate relevant webpages in an actual scenario is not limited to two. Usually, there are a larger number of candidate relevant webpages. Vector representations of the candidate relevant webpages and $v_s$ respectively undergo the fully-connected layer mapping to obtain the vector representations ($v_i$ and $v_j$ in the figure) of the candidate relevant webpages and the integrated vector representation $v_r$ of the sample query and the historical query sequence of the sample query respectively. Then, it is feasible to respectively determine a similarity degree between the vector representations of candidate relevant webpages and the integrated vector representation $v_r$, represented as $\cos(v_i, v_r)$ and $\cos(v_j, v_r)$ in the figure, and further output scores of candidate relevant webpages $d_i$ and $d_j$ respectively according to $\cos(v_i, v_r)$ and $\cos(v_j, v_r)$, wherein the higher the similarity degree is, the higher the corresponding scores are.

The first sorting sub-model and second sorting sub-model are trained to achieve respective preset training targets; the training target of the first sorting sub-model includes: maximizing relevancy between click situations of the candidate relevant entities and scores of candidate relevant entities, and the training target of the second sorting sub-model includes: maximizing relevancy between click situations of the candidate relevant webpages and scores of candidate relevant webpages.

Specifically, during training iteration, it is feasible to randomly select one from the first sorting sub-model and second sorting sub-model for training each time; or it is feasible to alternatingly train the first sorting sub-model and second sorting sub-model during the training iteration.

The training object of the first sorting sub-model may be specifically embodied as minimizing a preset first loss function. The first loss function Loss1 may be determined by using a negative log likelihood function of each $P(e^+|c, q_t)$, for example:

$$Loss1 = -\log \prod_{(c,q_t,e^+) \in \tau_{q_t}} P(e^+ | c, q_t)$$

where $q_t$ is the sample query, $e^+$ is a clicked candidate relevant entity of the sample query, and c is the historical query sequence of the sample query.

$$P(e^+ | c, q_t) = \frac{\exp(\gamma f(c, q_t, e^+))}{\sum_{e \in E_t} \exp(\gamma f(c, q_t, e))}$$

e is the candidate relevant entity of the sample query, $E_t$ is a candidate relevant entity set of the sample query, $\gamma$ is a preset parameter, and $f(c, q_t, e)$ is a similarity degree score between the integrated vector representation of $q_t$ and c and the vector representation of e, for example:

$$f(c, q_t, e) = \cos(v_m, v_e) = \frac{v_m^T v_e}{\|v_m\|\|v_e\|}$$

The training object of the second sorting sub-model may be specifically embodied as minimizing a preset second loss function. The second loss function Loss2 may be determined by using a negative log likelihood function of each $P(d^+|c, q_t)$, for example:

$$Loss2 = -\log \prod_{(c,q_t,d^+) \in \tau_{q_t}} P(d^+ | c, q_t)$$

where $q_t$ is the sample query, $d^+$ is a clicked candidate relevant webpage of the sample query, and c is the historical query sequence of the sample query.

$$P(d^+ | c, q_t) = \frac{\exp(\lambda f(c, q_t, d^+))}{\sum_{d \in D_t} \exp(\lambda f(c, q_t, d))}$$

d is the candidate relevant webpage of the sample query, $D_t$ is a candidate relevant webpage set of the sample query, $\lambda$ is a preset parameter, and $f(c, q_t, d)$ is a similarity degree score between the integrated vector representation of $q_t$ and c and the vector representation of d, for example:

During the training iteration, when the first sorting sub-model is trained, Loss 1 is used to update model parameters, for example, calculate a gradient of parameters and use obtained gradient to update the parameters. When the second sorting sub-model is trained, Loss2 is used to update model parameters. It is possible to constantly perform update iteration of parameters until iteration stop conditions are satisfied. The iteration stop conditions may include but not limited to: Loss1 converges, Loss1 is smaller than a preset threshold, or, iteration times reach a preset times threshold.

After completion of the training, the shared vector sub-model and the first sorting sub-model are used to obtain the entity-sorting model. That is to say, although during the training, training is performed by using the multi-task model, i.e., the second sorting sub-model assists in training the first sorting sub-model, but the finally-obtained entity-sorting model for performing relevant entity recommendation does not use the second sorting sub-model.

It needs to be appreciated that after training is performed in the training manner of using the multi-task model, a relevant webpage sorting model may also be obtained, i.e., the shared vector sub-model and the second sorting sub-model are used to obtain the relevant webpage sorting model. This manner is that the first sorting sub-model assists in training the second sorting sub-model, namely, the relevant entities assists in sorting the relevant webpages. The thus-obtained relevant webpage sorting model may obtain scores of respective relevant webpages in a relevant webpage set of the current query after the current query, the historical query sequence of the current query and the relevant webpage set of the current query, so as to determine relevant webpages of the current query to be displayed, according to the scores, as a basis for display selection and sorting of the relevant webpages.

The above describes the method according to the present disclosure in detail. The apparatus according to the present disclosure is described below in detail in conjunction with embodiments.

Figure 6:
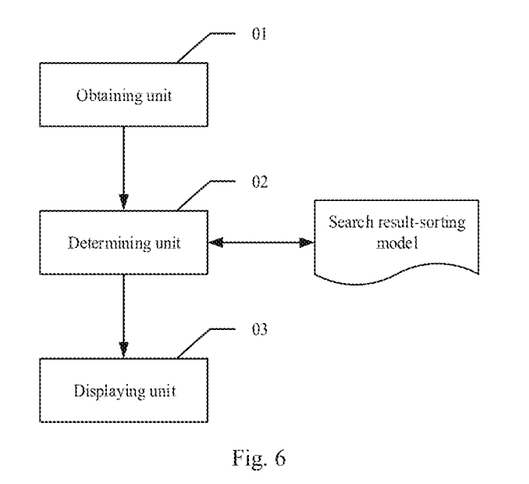
FIG. 6 is a structural schematic diagram of an apparatus for determining search results according to an embodiment of the present disclosure.

FIG. 6 is a structural schematic diagram of an apparatus for determining search results according to an embodiment of the present disclosure. As shown in FIG. 6, the apparatus may comprises: an obtaining unit 01 and a determining unit 02, and may further comprise a displaying unit 03. Main functions of the units are as follows:

The obtaining unit 01 is configured to obtain a current query, a historical query sequence of the current query and candidate relevant entities of the current query.

Wherein the historical query sequence of the current query comprises N queries before the current query in the same session, N being a positive integer.

The determining unit 02 is configured to input the current query, the historical query sequence of the current query and candidate search results of the current query into a search result-sorting model, score the candidate search results according to the search result-sorting model, and determine search results corresponding to the current query; wherein the scores rendered by the search result-sorting model for the candidate search results are determined according to a similarity degree between an integrated vector representation of the current query and the historical query sequence of the current query and vector representations of the candidate search results.

Specifically, the determining unit 02 may integrate the vector representation of the current query and the vector representation of the historical query sequence of the current query, and obtain an integrated vector representation of the current query and the historical query sequence of the current query.

Specifically, the determining unit 02 may use an attention mechanism to perform weighted processing for vector representations of respective queries in the historical query sequence of the current query, to obtain a vector representation of the historical query sequence of the current query.

The determining unit 02 allows input content to go through neural network processing and then obtains a vector representation of the input content; the input content may include the current query or queries in the historical query sequence of the current query. The neural network may employ but not limited to: a Recurrent Neural Network RNN and a Convolutional Neural Network.

The displaying unit 03 is configured to display search results corresponding to the current query in a search result page of the current query.

The search results include: relevant entities or relevant webpages. That is, the apparatus may be used in a search engine to determine relevant entities corresponding to the current query, to recommend determined relevant entities in the search result page. The apparatus may also be used in the search engine to determine relevant webpages corresponding to the current query, to display determined relevant webpages and their sorting in the search result page.

Figure 7:
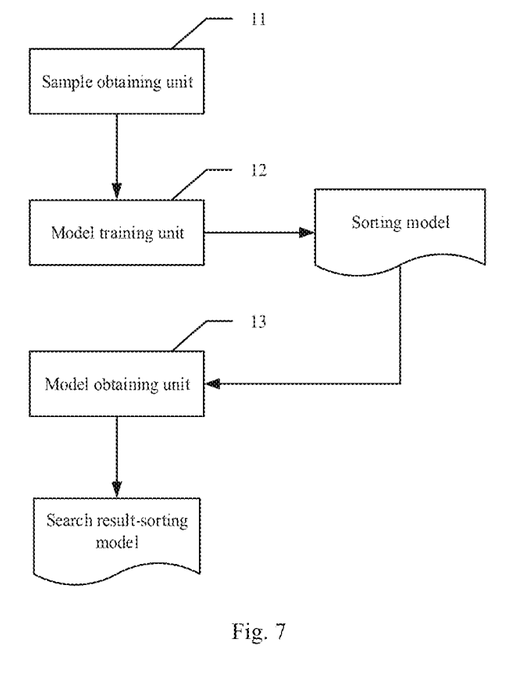
FIG. 7 is an apparatus for training a search result sorting model according to an embodiment of the present disclosure.

FIG. 7 is an apparatus for training a search result sorting model according to an embodiment of the present disclosure, wherein the apparatus comprises: a sample obtaining unit 11, a model training unit 12 and a model obtaining unit 13. Main functions of the units are as follows:

The sample obtaining unit 11 is configured to use a search log to obtain a training sample, the training sample comprising a sample query, a historical query sequence of the sample query, candidate search results of the sample query, and click situations of the candidate search results.

The model training unit 12 is configured to regard the sample query, the historical query sequence of the sample query and the candidate search results of the sample query as input of a sorting model, regard scores of the candidate search results rendered by the sorting model as output, and train the sorting model to achieve a preset training target; wherein the scores rendered by the sorting model for the candidate search results are determined according to a similarity degree between an integrated vector representation of the sample query and the historical query sequence of the sample query and vector representations of the candidate search results of the sample query; the training target includes: maximizing relevancy between click situations of the candidate search results and scores of candidate search results.

The model obtaining unit 13 is configured to use the sorting model obtained from the training to obtain a search result-sorting model.

As a preferred implementation mode, the apparatus may perform assistant training by using a multi-task model. The search result may include: first-class search results and second-class search results.

Correspondingly, the sorting model may comprise a shared vector sub-model, a first sorting sub-model and a second sorting sub-model.

The model training unit 12 inputs the sample query and the historical query sequence of the sample query into the shared vector sub-model to obtain an integrated vector representation of the sample query and the historical query sequence of the sample query; regards the integrated vector representation and the candidate first-class search results of the sample query as input of the first sorting sub-model, the first sorting sub-model outputting scores of respective candidate first-class search results; determine the scores of the candidate first-class search results according to a similarity degree between the integrated vector representation of the sample query and the historical query sequence of the sample query and the vector representations of the candidate first-class search results of the sample query; regard the integrated vector representation and candidate second-class search results of the sample query as input of the second sorting sub-model, the second sorting sub-model outputting scores of the candidate second-class search results; determine the scores of the candidate second-class search results according to a similarity degree between the integrated vector representation of the sample query and the historical query sequence of the sample query and the vector representations of the candidate second-class search results of the sample query; train the first sorting sub-model and second sorting sub-model to achieve respective preset training targets; the training target of the first sorting sub-model includes: maximizing relevancy between click situations of the candidate first-class search results and scores of candidate first-class search results, and the training target of the second sorting sub-model includes: maximizing relevancy between click situations of the candidate second-class search results and scores of candidate second-class search results.

The model obtaining unit 13, after completion of the training of the model training unit 12, uses the shared vector sub-model and one of the first sorting sub-model and second sorting sub-model, to obtain a search result sorting model.

Specifically, the model training unit 12, during training iteration, randomly selects one from the first sorting sub-model and second sorting sub-model for training each time; or alternatingly trains the first sorting sub-model and second sorting sub-model during the training iteration.

Wherein the model training unit 12 may use an attention mechanism to perform weighted processing for vector representations of respective queries in the historical query sequence of the sample query, to obtain a vector representation of the historical query sequence of the sample query; integrate the vector representation of the sample query and the vector representation of the historical query sequence of the sample query to obtain an integrated vector representation of the sample query and the historical query sequence of the sample query.

The model training unit 12 may allow the sample query to go through neural network processing and then obtain the vector representation of the sample query, and allow the queries in the historical query sequence of the sample query to go through neural network processing and then obtain vector representations of queries in the historical query sequence of the sample query, wherein the neural network may include a Recurrent Neural Network RNN and a Convolutional Neural Network, preferably BiLSTM.

The first-class search results may be relevant entities, and the second-class search results are relevant webpages.

The training object may be specifically embodied in a manner of minimizing a loss function. For example, the training object of the first sorting sub-model comprises minimizing a preset first loss function.

The first loss function Loss1 may be determined by using a negative log likelihood function of each $P(e^+|c, q_t)$, for example:

$$Loss1 = -\log \prod_{(c,q_t,e^+) \in \tau_{q_t}} P(e^+ | c, q_t)$$

where $q_t$ is the sample query, $e^+$ is a clicked candidate relevant entity of the sample query, and c is the historical query sequence of the sample query, $$P(e^+ | c, q_t) = \frac{\exp(\gamma f(c, q_t, e^+))}{\sum_{e \in E_t} \exp(\gamma f(c, q_t, e))},$$

e is the candidate relevant entity of the sample query, $E_t$ is a candidate relevant entity set of the sample query, $\gamma$ is a preset parameter, and $f(c, q_t, e)$ is a similarity degree score between the integrated vector representation of $q_t$ and c and the vector representation of e.

The training object of the second sorting sub-model may comprise: minimizing a preset second loss function. The second loss function Loss2 may be determined by using a negative log likelihood function of each $P(d^+|c, q_t)$, for example:

$$Loss2 = -\log \prod_{(c,q_t,d^+) \in \tau_{q_t}} P(d^+ | c, q_t)$$

where $q_t$ is the sample query, $d^+$ is a clicked candidate relevant webpage of the sample query, and c is the historical query sequence of the sample query, $$P(d^+ | c, q_t) = \frac{\exp(\lambda f(c, q_t, d^+))}{\sum_{d \in D_t} \exp(\lambda f(c, q_t, d))},$$

d is the candidate relevant webpage of the sample query, $D_t$ is a candidate relevant webpage set of the sample query, $f(c, q_t, d)$ is a similarity degree score between the integrated vector representation of $q_t$ and c and the vector representation of d, and $\lambda$ is a preset parameter.

During the training iteration, when the first sorting sub-model is trained, Loss1 is used to update model parameters, for example, calculate a gradient of parameters and use obtained gradient to update the parameters. When the second sorting sub-model is trained, Loss2 is used to update model parameters. It is possible to constantly perform update iteration of parameters until iteration stop conditions are satisfied. The iteration stop conditions may include but not limited to: Loss1 converges, Loss1 is smaller than a preset threshold, or, iteration times reach a preset times threshold.

Figure 8:
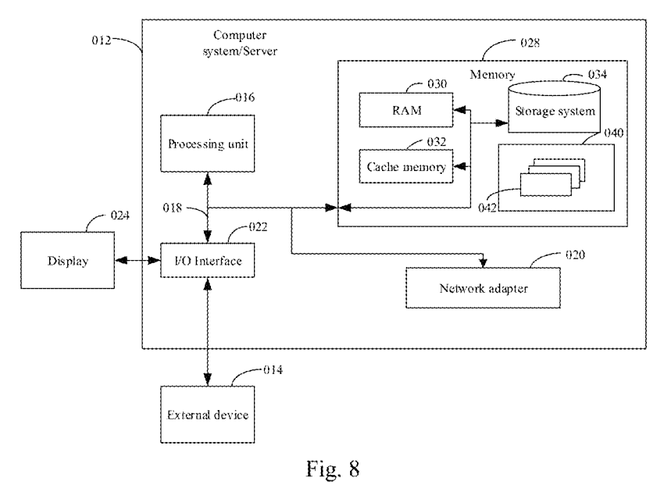
FIG. 8 is a block diagram of a computer system/server adapted to implement an implementation mode of the present disclosure.

FIG. 8 illustrates a block diagram of an example computer system/server 012 adapted to implement an implementation mode of the present disclosure. The computer system/server 012 shown in FIG. 8 is only an example and should not bring about any limitation to the function and scope of use of the embodiments of the present disclosure.

As shown in FIG. 8, the computer system/server 012 is shown in the form of a general-purpose computing device. The components of computer system/server 012 may include, but are not limited to, one or more processors (processing units) 016, a memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

Memory 028 can include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 can be provided for reading from and writing to a non-removable, non-volatile magnetic media (not shown in FIG. 8 and typically called a "hard drive"). Although not shown in FIG. 8, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc. In the present disclosure, the computer system/server 012 communicates with an external radar device, or with one or more devices that enable a user to interact with computer system/server 012; and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a general wide area network (WAN), and/or a public network (e.g., the Internet) via a network adapter 020. As depicted in the figure, network adapter 020 communicates with the other communication modules of computer system/server 012 via the bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes various function applications and data processing by running programs stored in the memory 028, for example, implement steps of the method provided by embodiments of the present disclosure.

The above-mentioned computer program may be set in a computer storage medium, i.e., the computer storage medium is encoded with a computer program. When the program, executed by one or more computers, enables said one or more computers to execute steps of methods and/or operations of apparatuses as shown in the above embodiments of the present disclosure. For example, steps of the method executed by said one or more processors may be steps of the method in the embodiment shown in FIG. 3.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a computer readable signal medium or a computer readable storage medium. A computer readable medium for example may include, but not limited to, an electronic, magnetic, optical, electromagnetic, infrared, or semiconductor system, apparatus, or device, or any suitable combination of the foregoing. More specific examples (non-exhaustive listing) of the computer readable storage medium would include an electrical connection having one or more conductor wires, a portable computer magnetic disk, a hard disk, a random access memory (RAM), a read-only memory (ROM), an erasable programmable read-only memory (EPROM or Flash memory), optical fiber, a portable compact disc read-only memory (CD-ROM), an optical storage device, a magnetic storage device, or any suitable combination of the foregoing. In the text herein, the computer readable storage medium can be any tangible medium that includes or stores a program. The program may be used by an instruction execution system, apparatus or device or used in conjunction therewith.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It can be seen from the above technical solutions that the method, apparatus, device and computer storage medium provided by the present disclosure may have the following advantages:

1) In the present disclosure, the historical query sequence of the current query is regarded as a basis for determining search results, the determination of search results is achieved by a context-related search result sorting model, thereby improving the accuracy of search result recommendation so that it better meets the user's search demands. The present disclosure, when applied to entity recommendation, can remove ambiguity of the current query and provide more accurate relevant entities meeting the user's search demands.

2) In the present disclosure, when the search result sorting model is trained assistant training between different search results is achieved through a multi-task model learning model, for example, relevant webpages assist in training the sorting model of relevant entities, so that association between different tasks is used to improve extensibility and accuracy of the model.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method of determining search results, wherein the method comprises:
obtaining a current query, a historical query sequence of the current query and candidate search results of the current query;
inputting the current query, the historical query sequence of the current query and candidate search results of the current query into a search result-sorting model, scoring the candidate search results according to the search result-sorting model, and determining search results corresponding to the current query; wherein the scores rendered by the search result-sorting model for the candidate search results are determined according to a similarity degree between an integrated vector representation of the current query and the historical query sequence of the current query and vector representations of the candidate search results.

2. The method according to claim 1, wherein the historical query sequence of the current query comprises N queries before the current query in the same session, N being a positive integer.

3. The method according to claim 1, wherein an integrated vector representation of the current query and the historical query sequence of the current query is determined in the following manner:

integrating the vector representation of the current query and the vector representation of the historical query sequence of the current query.

4. The method according to claim 3, wherein the vector representation of the historical query sequence of the current query is determined in the following manner:

using an attention mechanism to perform weighted processing for vector representations of respective queries in the historical query sequence of the current query, to obtain a vector representation of the historical query sequence of the current query.

5. The method according to claim 1, wherein the vector representation is determined in the following manner:

allowing input content to go through neural network processing and then obtaining a vector representation of the input content; wherein the input content includes the current query or queries in the historical query sequence of the current query.

6. The method according to claim 5, wherein the neural network comprises: a Recurrent Neural Network RNN or a Convolutional Neural Network.

7. The method according to claim 1, wherein the method further comprises:

displaying search results corresponding to the current query in a search result page of the current query.

8. The method according to claim 1, wherein the search results include:

relevant entities or relevant webpages.

9. A method of training a search result sorting model, wherein the method comprises:

using a search log to obtain a training sample, the training sample comprising a sample query, a historical query sequence of the sample query, candidate search results of the sample query, and click situations of the candidate search results;

regarding the sample query, the historical query sequence of the sample query and the candidate search results of the sample query as input of a sorting model, regarding scores of the candidate search results rendered by the sorting model as output, and training the sorting model to achieve a preset training target; wherein the scores rendered by the sorting model for the candidate search results are determined according to a similarity degree between an integrated vector representation of the sample query and the historical query sequence of the sample query and vector representations of the candidate search results of the sample query; the training target includes: maximizing relevancy between click situations of the candidate search results and scores of candidate search results;

using the sorting model obtained from the training to obtain a search result-sorting model.

10. The method according to claim 9, wherein the search results comprise: first-class search results and second-class search results;

the sorting model comprises a shared vector sub-model, a first sorting sub-model and a second sorting sub-model;

inputting the sample query and the historical query sequence of the sample query into the shared vector sub-model to obtain an integrated vector representation of the sample query and the historical query sequence of the sample query;

regarding the integrated vector representation and the candidate first-class search results of the sample query as input of the first sorting sub-model, the first sorting sub-model outputting scores of respective candidate first-class search results; determining the scores of the candidate first-class search results according to a similarity degree between the integrated vector representation of the sample query and the historical query sequence of the sample query and the vector representations of the candidate first-class search results of the sample query;

regarding the integrated vector representation and candidate second-class search results of the sample query as input of the second sorting sub-model, the second sorting sub-model outputting scores of respective candidate second-class search results; determining the scores of the candidate second-class search results according to a similarity degree between the integrated vector representation of the sample query and the historical query sequence of the sample query and the vector representations of the candidate second-class search results of the sample query;

training the first sorting sub-model and second sorting sub-model to achieve respective preset training targets; the training target of the first sorting sub-model includes: maximizing relevancy between click situations of the candidate first-class search results and scores of candidate first-class search results, and the training target of the second sorting sub-model includes: maximizing relevancy between click situations of the candidate second-class search results and scores of candidate second-class search results;

after completion of the training, using the shared vector sub-model and one of the first sorting sub-model and the second sorting sub-model, to obtain the search result sorting model.

11. The method according to claim 10, wherein the training the first sorting sub-model and second sorting sub-model comprises:

during training iteration, randomly selecting one from the first sorting sub-model and second sorting sub-model for training each time; or alternatingly training the first sorting sub-model and second sorting sub-model during the training iteration.

12. The method according to claim 10, wherein the first-class search results are relevant entities, and the second-class search results are relevant webpages.

13. The method according to claim 12, wherein a training object of the first sorting sub-model comprises: minimizing a preset first loss function;

wherein the first loss function is determined by using a negative log likelihood function of each $P(e^+|c,q_t)$;

where $q_t$ is the sample query, $e^+$ is a clicked candidate relevant entity of the sample query, and c is the historical query sequence of the sample query, $$P(e^+ \mid c, q_t) = \frac{\exp(\gamma f(c, q_t, e^+))}{\sum_{e \in E_t} \exp(\gamma f(c, q_t, e))},$$

e is the candidate relevant entity of the sample query, $E_t$ is a candidate relevant entity set of the sample query, $f(c,q_t,e)$ is a similarity degree score between the integrated vector representation of $q_t$ and c and the vector representation of e, and γ is a preset parameter;

a training object of the second sorting sub-model may comprise: minimizing a preset second loss function, wherein the second loss function is determined by using a negative log likelihood function of each $P(d^+|c, q_t)$;

where $q_t$ is the sample query, $d^+$ is a clicked candidate relevant webpage of the sample query, and c is the historical query sequence of the sample query, $$P(d^+ \mid c, q_t) = \frac{\exp(\lambda f(c, q_t, d^+))}{\sum_{d \in D_t} \exp(\lambda f(c, q_t, d))},$$

d is the candidate relevant webpage of the sample query, $D_t$ is a candidate relevant webpage set of the sample query, $f(c,q_t,d)$ is a similarity degree score between the integrated vector representation of $q_t$ and c and the vector representation of d, and λ is a preset parameter.

14. The method according to claim 9, wherein an integrated vector representation of the sample query and the historical query sequence of the sample query is determined in the following manner:

integrating the vector representation of the sample query and the vector representation of the historical query sequence of the sample query.

15. The method according to claim 14, wherein the vector representation of the historical query sequence of the sample query is determined in the following manner:

using an attention mechanism to perform weighted processing for vector representations of respective queries in the historical query sequence of the sample query, to obtain a vector representation of the historical query sequence of the sample query.

16. The method according to claim 9, wherein the vector representation is determined in the following manner:

allowing input content to go through neural network processing and then obtaining a vector representation of the input content; wherein the input content includes the sample query or queries in the historical query sequence of the sample query.

17. The method according to claim 16, wherein the neural network comprises: a Recurrent Neural Network RNN or a Convolutional Neural Network.

18. A device, wherein the device comprises:
one or more processors;
a storage for storing one or more programs;
the one or more programs, when executed by said one or more processors, enable said one or more processors to implement a method of determining search results, wherein the method comprises:
obtaining a current query, a historical query sequence of the current query and candidate search results of the current query;
inputting the current query, the historical query sequence of the current query and candidate search results of the current query into a search result-sorting model, scoring the candidate search results according to the search result-sorting model, and determining search results corresponding to the current query; wherein the scores rendered by the search result-sorting model for the candidate search results are determined according to a similarity degree between an integrated vector representation of the current query and the historical query sequence of the current query and vector representations of the candidate search results.

19. A device, wherein the device comprises:
one or more processors;
a storage for storing one or more programs;
the one or more programs, when executed by said one or more processors, enable said one or more processors to implement a method of training a search result sorting model, wherein the method comprises:
using a search log to obtain a training sample, the training sample comprising a sample query, a historical query sequence of the sample query, candidate search results of the sample query, and click situations of the candidate search results;
regarding the sample query, the historical query sequence of the sample query and the candidate search results of the sample query as input of a sorting model, regarding scores of the candidate search results rendered by the sorting model as output, and training the sorting model to achieve a preset training target; wherein the scores rendered by the sorting model for the candidate search results are determined according to a similarity degree between an integrated vector representation of the sample query and the historical query sequence of the sample query and vector representations of the candidate search results of the sample query; the training target includes: maximizing relevancy between click situations of the candidate search results and scores of candidate search results;
using the sorting model obtained from the training to obtain a search result-sorting model.

20. A storage medium including computer executable instructions, wherein the computer executable instructions, when executed by a computer processor, implement a method of determining search results, wherein the method comprises:
obtaining a current query, a historical query sequence of the current query and candidate search results of the current query;
inputting the current query, the historical query sequence of the current query and candidate search results of the current query into a search result-sorting model, scoring the candidate search results according to the search result-sorting model, and determining search results corresponding to the current query; wherein the scores rendered by the search result-sorting model for the candidate search results are determined according to a similarity degree between an integrated vector representation of the current query and the historical query sequence of the current query and vector representations of the candidate search results.

21. A storage medium including computer executable instructions, wherein the computer executable instructions, when executed by a computer processor, implement a method of training a search result sorting model, wherein the method comprises:
using a search log to obtain a training sample, the training sample comprising a sample query, a historical query sequence of the sample query, candidate search results of the sample query, and click situations of the candidate search results;
regarding the sample query, the historical query sequence of the sample query and the candidate search results of the sample query as input of a sorting model, regarding scores of the candidate search results rendered by the sorting model as output, and training the sorting model to achieve a preset training target; wherein the scores rendered by the sorting model for the candidate search results are determined according to a similarity degree between an integrated vector representation of the sample query and the historical query sequence of the sample query and vector representations of the candidate search results of the sample query; the training target includes: maximizing relevancy between click situations of the candidate search results and scores of candidate search results;

using the sorting model obtained from the training to obtain a search result-sorting model.

* * * * *